Figure 1:
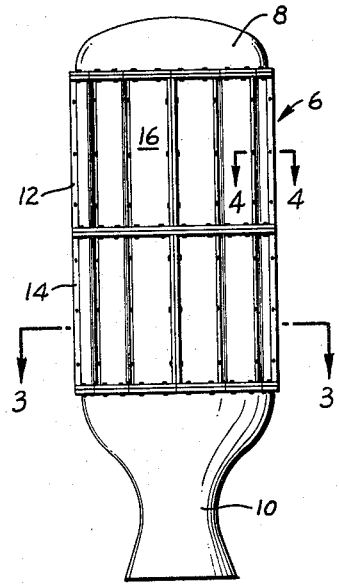

March 30, 1965 V. L. HEAD 3,175,497
SEGMENTED ROCKET ENGINE
Filed Feb. 20, 1962 2 Sheets-Sheet 1

INVENTOR.
VERNON L. HEAD
BY
Eckhoff & Slick
ATTORNEYS

March 30, 1965 V. L. HEAD 3,175,497
SEGMENTED ROCKET ENGINE
Filed Feb. 20, 1962 2 Sheets-Sheet 2

INVENTOR.
VERNON L. HEAD
BY
Eckhoff & Slick
ATTORNEYS 3,175,497
SEGMENTED ROCKET ENGINE
Vernon L. Head, San Jose, Calif., assignor to United Aircraft Corporation, a corporation of Delaware
Filed Feb. 20, 1962, Ser. No. 174,454
1 Claim. (Cl. 102—98)

This invention relates to rocket motors and more particularly relates to solid fuel rocket motors wherein the motor comprises a series of segments which can be assembled to produce the finished rocket motor.

As solid fuel rockets become larger in size, they become impractical if made in a single piece. Loads much greater than fifty tons or over thirteen feet in smallest dimension are severely limited in transportability. Since the cases for such motors must be heat treated and the propellant must be cured after the rocket is loaded, serious manufacturing difficulties are encountered in making large rocket motors. Further, facilities for making rocket motors ordinarily do not exist at desired launching sites so that it is important both from the question of manufacturing ease and transportability that no portion of a rocket motor be over a certain critical size. A further difficulty with large single piece rocket motors is that should a defective motor be produced, there is no practical way of getting rid of it. A large motor would be almost impossible to move because of its size and it could not be fired because of the danger of explosion. Another difficulty with large motors is that it is difficult to mix large batches of the propellant and it is difficult to cure large web thicknesses of rocket grain. For all of the above reasons, it is highly desirable to provide a rocket motor wherein no one piece of the engine is larger than a small fraction of the weight of the finished engine. Although it has previously been proposed to make motors from a series of circular segments in very large motors such segments become too large for easy manufacture and handling.

In addition to the size limitations discussed above, it is often desirable to provide solid propellant rocket motors which can be assembled from standard components to produce motors of varying thrust. In this manner, motors of various sizes can be assembled from a relatively small number of standard components depending upon the mission at hand, solving the problem of stocking a different size rocket motor for each particular thrust requirement. Thus, although the present invention is primarily applicable to motors of large size, it is still of value in producing relatively small motors.

Generally speaking, the objects of the present invention are achieved by providing a series of segments which can be assembled into a finished solid propellant rocket motor. Each of the segments has a shape generally resembling in cross section an isosceles trapezoid although as will later appear, slight departures from this exact configuration may be employed.

Figure 2:
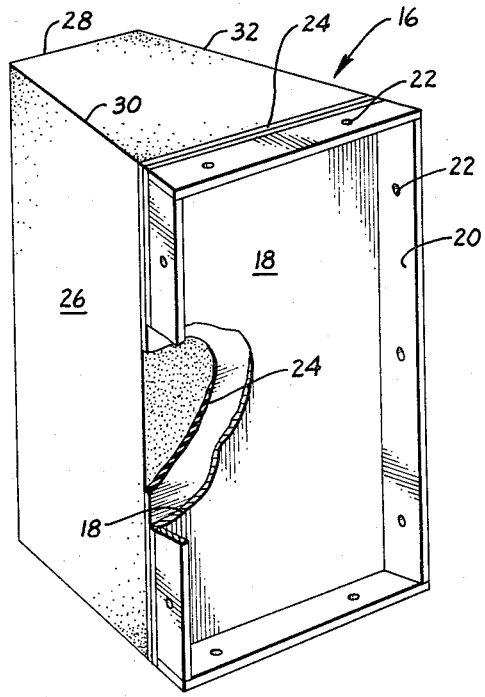
Figure 3:
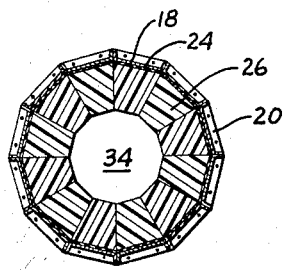
Figure 4:
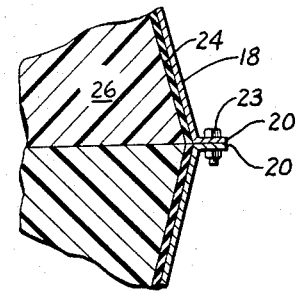
Figure 5:
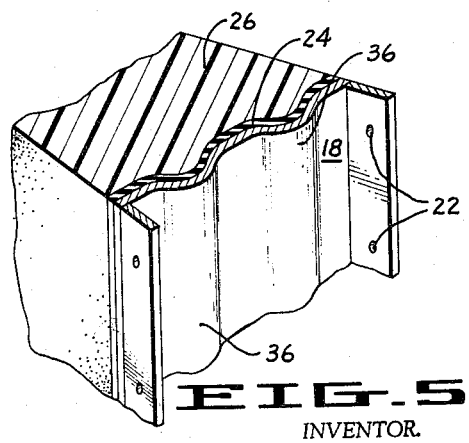
Figure 6:
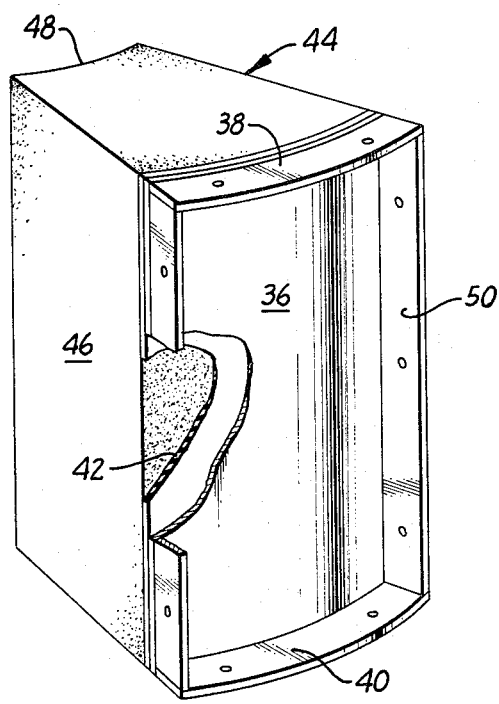
Figure 7:
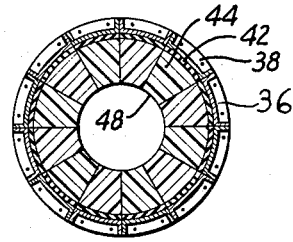

In the drawings forming a part of this application:
FIGURE 1 is a side view of an assembled rocket motor embodying the present invention.
FIGURE 2 is an isometric view, partially in section, of one of the segments which may be used in forming the rocket motor of FIGURE 1.
FIGURE 3 is a section on the lines 3—3 of FIGURE 1.
FIGURE 4 is an enlarged partial sectional view on the line 4—4 of FIGURE 1.
FIGURE 5 is a partial isometric view showing another embodiment of the invention.
FIGURE 6 is an isometric view, partly in section, showing anothert embodiment of the invention.
FIGURE 7 is a section, similar to FIGURE 3.

Referring now to the drawings by reference characters there is shown in FIGURES 1 through 4 a rocket motor generally designated 6 having a head 8 and a nozzle 10 and a central body portion composed of an upper bank 12 and a lower bank 14 of segments 16. Each of the segments 16 comprises a series of wall sections 18, suitably made of steel or reinforced plastic with a plurality of flanges 20 thereon having holes 22 therein so that the wall flanges can be bolted or otherwise suitably fastened to the flanges of abutting segments, as well as to mating flanges on the head and nozzle to form the completed rocket motor. Each of the segments 16 has formed on the wall 18 a liner 24 to which is attached the solid propellant grain 26.

The inner surface 28 of the grain 26 is generally parallel to the outer wall 18 while the sides 30 and 32 are of equal length so that in section the segment is in the form of an isosceles trapezoid. The relative widths of the outer wall 18 and the surface of the grain 28 are generally chosen so that when the segments are assembled, as is shown in FIGURE 3, a polyhedron is produced with the walls of the grain segments in contact with each other forming a central burning port 34. In some instances, the dimensions can be chosen so that a small amount of space is left between the grains of the various segments providing a rocket motor of increased burning surface or, if desired, the sides of the grain may be coated with a restricter substance either before or during assembly of the motor so that burning can occur only outwardly from the central port 34.

In FIGURE 5 another embodiment of the invention is shown wherein the outer wall 18 of each of the segments is provided with corrugations as at 36 for greater stiffness.

Although the segments have been described as being generally of the shape of an isosceles trapezoid slight departures from this exact figure may be made. Thus, the outer wall may be given a slight convex curvature in one plane so that the outer surface of the assembled motor is substantially a perfect circle rather than a polyhedron. Similarly the inner surface may be slightly curved concave to provide a circular central burning port.

In FIGURE 6 there is shown a segment 44 having both the outer wall and the inner surface of the propellant grain in the form of a curve rather than being flat. Here the wall section 36 is curved as at 38 and 40. The liner 42 is bonded to the curved wall 36 and the propellant grain is bonded to the liner. Flanges 50 provide means for attaching the segments together. The side surfaces of the propellant grain as at 46 are flat but converge towards each other while the inner surface 48 of the propellant grain is curved. Thus when a plurality of said segments are assembled as is shown in reduced scale in FIGURE 7 with the flat side surfaces of the propellant grains in contact, the members 36 form a substantially perfect circle rather than a polyhedron. Similarlyl, the curved inner surfaces 48 form a substantially circular central burning port.

Segments made in accordance with the present invention can be assembled in end to end relationship as well as side by side relationship to produce rockets of various lengths. For instance, in FIGURE 1 a rocket is shown having two rows of segments but it is obvious that more than two rows could have been used or that a single row might have been used by attaching the head 8 and the nozzle 10 to a single row of segments.

The segments of the present invention can be easily fabricated using well known methods of the solid propellant art. Normally the casing section 18 would be fabricated of steel or reinforced plastic with the flanges 22 fastened thereto by suitable means such as welding although the whole assembly could be drawn or molded as a unit. The liner 24 would then be bonded to the section 18 and the whole assembly placed in a suitable mold, the solid propellant composition poured in the mold and cured. The segment can then be removed from the mold.

Although it is preferred to provide flanges with mating flanges on the segments, other means of attachment of the segments may be utilized. For instance, tongue and groove fasteners may be arranged at the periphery of the segments or the segments may be made without means for attachment and the segments held in assembled relationship by external bands or shelves.

I claim:

In a longitudinally extending segment for fabricating an axially perforated propellant grain, said segment having a first side for forming said axial perforation of the grain, an opposing second side for forming the outside surface of said grain, two opposing side surfaces which mate with similar longitudinally extending segments and two opposing end surfaces for forming the forward surface and aft surface of said grain; in combination with said segment a structural plate having an inside surface and an outside surface and longitudinal and transverse edges which plate extends longitudinally and transversely over said second side of said segment, means for joining the inside surface of said structural plate and the second side of said segment, and flange means at the longitudinal and transverse edges of said structural plate for accommodating fasteners for joining adajacent segments.

References Cited by the Examiner
UNITED STATES PATENTS

| | | | |
|---|---|---|---|
| 826,293 | 7/06 | Unge | 102—34 |
| 2,114,214 | 4/38 | Damblanc | 60—35.6 |
| 2,484,355 | 10/49 | Parsons | 102—98 |
| 2,816,418 | 12/57 | Loedding | 60—35.6 |
| 2,953,276 | 9/60 | Dunn | 220—5 |
| 3,048,112 | 8/62 | Shope | 102—98 |
| 3,048,968 | 8/62 | Hutchinson | 60—39.47 |
| 3,054,353 | 9/62 | Rumpp et al. | 102—98 |

OTHER REFERENCES

German printed application 1,062,498, July 30, 1959, 1 sheet, 3 pages.

SAMUEL LEVINE, *Primary Examiner.*